United States Patent [19]

Ueno

[11] Patent Number: 5,045,589
[45] Date of Patent: Sep. 3, 1991

[54] POLYPROPYLENE COMPOSITION
[75] Inventor: Kouhei Ueno, Sakai, Japan
[73] Assignee: UBE Industries, Ltd., Japan
[21] Appl. No.: 438,878
[22] Filed: Nov. 20, 1989
[30] Foreign Application Priority Data
   Nov. 21, 1988 [JP] Japan ................................. 63-294432
[51] Int. Cl.$^5$ .............................................. C08K 53/00
[52] U.S. Cl. ..................... 524/505; 525/88; 525/89
[58] Field of Search ..................... 524/505; 525/88, 89
[56] References Cited
   U.S. PATENT DOCUMENTS 4,621,114 11/1986 Watanabe ............................ 524/505
   4,687,804 8/1987 Shiraishi ............................. 524/505
   4,737,536 4/1988 Kawase ............................. 524/505

FOREIGN PATENT DOCUMENTS 0009276 5/1979 European Pat. Off. .
   13647 1/1972 Japan .
   66517 10/1976 Japan .
   21076 5/1977 Japan .
   21049 8/1977 Japan .
   73741 3/1980 Japan .
   45715 4/1980 Japan .
   5949252 2/1982 Japan .
   185333 6/1982 Japan .
   27593 11/1983 Japan .
   206659 11/1983 Japan .
   89635 12/1983 Japan .
   226041 1/1984 Japan .
   23432 2/1985 Japan .
   61-43650 3/1986 Japan ................................. 524/505
   98758 7/1986 Japan .
   2121420 12/1983 United Kingdom ................ 524/505

*Primary Examiner*—Paul R. Michl
*Assistant Examiner*—Edward J. Cain
*Attorney, Agent, or Firm*—Charles P. Boukus, Jr.

[57] ABSTRACT

The present invention relates to a polypropylene composition comprising a crystalline ethylene-propylene block copolymer having an ethylene content of 5-20% by weight and a melt flow index of 11-90, a thermoplastic elastomer, an amorphous propylene-α-olefin random copolymer having a number-average molecular weight of 1,000-20,000 and a propylene content of 40-95% by weight and an inorganic filler. This composition can be made into a molded article having no flow mark on the surface. The molded article is superior in rigidity, heat deformation resistance, low temperature impact resistance and coatability, has appearance free from waviness, voids, etc., and is suitable for use particularly in high quality bumper for automobiles.

9 Claims, No Drawings

POLYPROPYLENE COMPOSITION

BACKGROUND OF THE INVENTION AND RELATED ART STATEMENT

The present invention relates to a polypropylene composition and more particularly to a polypropylene composition composed mainly of a crystalline ethylene-propylene block copolymer, which has excellent moldability and can provide a molded article superior particularly in impact resistance, coatability and appearance.

Crystalline polypropylenes are in use in various molded articles in which physical properties such as rigidity, resistance to heat deformation and the like are required. However, having insufficient low temperature properties and being a non-polar highly-crystalline polymer, crystalline polypropylenes have poor impact resistance and poor coatability and cannot be used in applications in which rigidity, resistance to heat deformation, impact resistance and coatability are required together.

In order to improve the impact resistance and coatability of crystalline polypropylenes, there have been proposed, for example, a polypropylene composition which is a blend of a crystalline ethylene-propylene block copolymer as a crystalline polypropylene with an amorphous ethylene-propylene copolymer, and a polypropylene composition which is a blend of crystalline ethylene-propylene block copolymer, an amorphous ethylene-propylene copolymer and various polyethylenes.

In these polypropylene compositions, however, the rigidity, resistance to heat deformation, etc. inherently possessed by crystalline ethylene-propylene block copolymers are reduced.

Japanese Patent Application Kokai (Laid-Open) No.64257/1978 discloses a resin composition with improved low temperature impact resistance, comprising a crystalline ethylene-propylene block copolymer, an amorphous ethyleneolefin copolymer and talc. The document describes that the resin composition, as compared with conventional crystalline ethylene-propylene block copolymers, is significantly improved in low temperature impact resistance, rigidity and coatability.

The compositions described in Examples of the above patent document use, as polymer components, a crystalline ethylene-propylene block copolymer having a melt flow index of 1.5, and an ethylene-propylene-nonconjugated diene copolymer having a melt flow index of 0.4 or an amorphous ethylene-propylene copolymer having a melt flow index of 0.8. All of these polymers have a very high molecular weight. Resultantly, the above compositions are fully satisfactory with respect to the purpose of obtaining a polypropylene molded article superior in rigidity, heat deformation resistance and impact strength, but have drawbacks in that the molded articles produced therefrom have flow marks on the surface, resultantly have poor appearance, have insufficient coatability, and thus have a low commercial value. Consequently, the molded articles obtained from the compositions are unsuitable for use in applications (e.g. parts for automobiles, particularly bumper) where mechanical properties and appearance are required, although the articles can find limited applications where appearance can be neglected.

Polypropylene compositions with improved impact resistance are proposed also in Japanese Patent Application Kokai (Laid-Open) Nos. 136735/1976, 22552/1978, 64256/1978, 21494/1980, 55952/1982, 159841/1982, 159842/1982, 207630/1982, 177038/1982, 111846/1983, 168648/1983, etc. These polypropylene compositions, however, are inferior in moldability and accordingly give molded articles with poor appearance.

SUMMARY OF THE INVENTION

As stated above, conventionally known compositions containing a crystalline ethylene-propylene block copolymer, etc. have been unable to provide molded articles having good moldability, a good balance of rigidity and impact strength, excellent coatability and excellent appearance.

The object of the present invention is to provide a polypropylene composition having good fluidity during molding and capable of providing a molded article with a large Izod impact strength at low temperatures, a good balance in rigidity and impact strength, excellent appearance and excellent coatability.

The above object has been achieved by a composition comprising a particular crystalline ethylene-propylene block copolymer, a thermoplastic elastomer, a particular amorphous propylene-α-olefin random copolymer and an inorganic filler at given proportions.

According to the present invention, there is provided a polypropylene composition comprising:

(A) 35–74% by weight of a crystalline ethylene-propylene block copolymer having an ethylene content of 5–20% by weight and a melt flow index of 11–90, (B) 20–40% by weight of a thermoplastic elastomer, (C) 1–15% by weight of an amorphous propylene-α-olefin random copolymer having a number-average molecular weight of 1,000–20,000 and a propylene content of 40–95% by weight, and (D) 5–25% by weight of an inorganic filler.

When the polypropylene composition of the present invention is subjected to molding, there can be obtained at good moldability a molded article which gives a residual paint proportion of 100% when measured according to a cross-cut adhesion test, which has no flow mark, which substantially retains the rigidity, heat deformation resistance, etc. inherently possessed by the crystalline ethylene-propylene block copolymer used in the composition, and which has significantly improved low temperature impact resistance, coatability and appearance. The polypropylene composition of the present invention, even when made into a large-sized molded article, for example, a molded article of 1 m or more in length, gives no flow mark, no waviness and no void, and enables low temperature molding because of good fluidity; therefore, the composition can be molded into a high quality bumper.

DETAILED DESCRIPTION OF THE INVENTION

The crystalline ethylene-propylene block copolymer used as the component (A) in the polypropylene composition of the present invention has an ethylene content of 5–20% by weight, preferably 5–15% by weight and a melt flow index of 11–90 (g/10 min, measured by ASTM D1238, the same applies hereinafter), preferably 12–60. When the ethylene content is less than 5% by weight, the resulting composition gives a molded article having reduced low temperature impact resistance and reduced coatability. When the ethylene content is more than 20% by weight, the composition gives a molded article with reduced rigidity.

When the melt flow index is less than 11, the resulting composition has reduced moldability particularly in obtaining a large-sized molded article and gives a molded article with poor appearance (this poor appearance is striking in a larged-sized molded article). When the melt flow index is more than 90, the resulting composition gives a molded article with reduced impact resistance. These polypropylene compositions cannot be used as a material for molded articles where rigidity, heat deformation resistance, low temperature impact resistance, coatability and excellent appearance are required.

The crystalline ethylene-propylene block copolymer used in the present invention can be produced according to an ordinary method. It is produced so as to have a desired ethylene content and a desired melt flow index to meet the application purpose.

The crystalline ethylene-propylene block copolymer is contained in the composition of the present invention in an amount of 35-74% by weight, preferably 44-70% by weight. When the amount is outside the range of 35-74% by weight, the resulting composition has a reduced balance of rigidity and impact strength. The crystalline ethylene-propylene block copolymer may be used in a combination of two or more as long as their total amount is within the above range.

When the crystalline ethylene-propylene block copolymer is used in combination of two or more, the copolymers preferably have different melt flow indexes. A combination of a copolymer having a melt flow index of 11-50 and a copolymer having a melt flow index of 20-90 is particularly preferred.

The thermoplastic elastomer used as the component (B) in the present polypropylene composition is preferably, for example, olefin type elastomers such as ethylene-propylene rubber (EPR), ethylene-butylene rubber (EBR), ethylene-propylene-butylene rubber (EPBR), ethylene-propylene-diene rubber (EPDM) and the like, and styrene type elastomers such as styrene-butadiene-styrene rubber (SBR), styrene-isoprenestyrene rubber (SIS), hydrogenated SBS (SEBS), hydrogenated SIS (SEPS), styrene-butadiene rubber and the like. Of these, EPR, EBR, EPBR, SEBS and SEPS are particularly preferred.

The thermoplastic elastomer is used alone or in combination of two or more and is contained in the present composition in an amount of 20-40% by weight, preferably 20-35% by weight. When the amount is less than 20% by weight, the resulting composition gives a molded article with reduced low temperature impact resistance and reduced coatability. When the amount is more than 40% by weight, the composition gives a molded article with reduced rigidity.

The amorphous propylene-α-olefin random copolymer used as the component (C) in the polypropylene composition of the present invention includes a propylene-ethylene random copolymer, a propylene-butylene random copolymer, a propylene-ethylene-butylene random copolymer, etc. Of these, a propylene-ethylene random copolymer and a propylene-butylene random copolymer are particularly preferred.

The propylene content in the random copolymer is 40-95% by weight, preferably 50-92% by weight. When the propylene content is less than 40% by weight, the resulting composition gives a molded article with poor rigidity. When the propylene content is more than 95% by weight, the resulting composition gives a molded article with reduced low temperature impact resistance.

The number-average molecular weight of the random copolymer is 1,000-20,000, preferably 1,500-18,000. When the number-average molecular weight is less than 1,000, the resulting composition gives a molded article of low rigidity. When the molecular weight is more than 20,000, the composition has poor fluidity in molding and gives a molded article of reduced appearance.

The amorphous propylene-α-olefin random copolymer is contained in the present composition in an amount of 1-15% by weight, preferably 2-10% by weight. When the amount is less than 1% by weight, the resulting composition has low fluidity in molding. When the amount is more than 15% by weight, the composition gives a molded article of insufficient rigidity.

The random copolymer may be used in combination of two or more, as long as the total amount is within the above range.

The inorganic filler used as the component (D) in the polypropylene composition of the present invention includes talc, calcium carbonate, clay, mica, silica, wollastonite, magnesium oxysulfate, titanium oxide, diatomaceous earth, etc., all of powder, short fiber or flake form. Of them, preferable are talc, calcium carbonate, mica and magnesium oxysulfate. They are used alone or in admixture. The inorganic fillers of powder form preferably have an average particle diameter of 0.01-5 μm; the inorganic fillers of flake form preferably have a diameter of 0.1-20 μm; and the inorganic fillers of short fiber form preferably have a fiber length of 5-30 μm.

The inorganic filler is contained in the present composition in an amount of 5-25% by weight, preferably 7-20% by weight. When the amount is less than 5% by weight, the resulting composition gives a molded article with no improved rigidity. When the amount is more than 25% by weight, the composition gives a molded article of reduced low temperature impact resistance. The inorganic filler can be used in an untreated state, or in order to allow the inorganic filler to have improved adhesion to the matrix or improved dispersibility, after the particles of the inorganic filler have been coated with an organic titanate type coupling agent, a silane type coupling agent, a fatty acid, a metal salt of a fatty acid, a fatty acid ester, a fatty acid amide or the like.

The polypropylene composition of the present invention can easily be obtained by kneading individual components with heating, using a kneader (e.g. Banbury mixer, heated roll, kneader, high-speed double-screw extruder, double-screw extruder, single-screw extruder), preferably a Banbury mixer or a high-speed double-screw extruder. Ordinarily, the polypropylene composition is obtained from the kneader in pellet form and then used for the subsequent processing. The composition of pellet form can be produced by kneading individual components in one step, or by kneading a high concentration master batch of an inorganic filler (containing a crystalline ethylene-propylene block copolymer as a base polymer) and then diluting the resulting mixture with a supplemental amount of the crystalline ethylene-propylene block copolymer and a thermoplastic elastomer.

The polypropylene composition of the present invention can further comprise other resins and rubbers in such amounts as the effects of the composition are not impaired.

In order for the molded article obtained from the polypropylene composition of the present invention to have higher properties and durability, it is possible to incorporate into the composition during or after the kneading of the individual components or by adding to the polymer component(s), various additives such as antioxidant [e.g. 2,6-di-tert-butyl-phenol, 2,6-di-tert-butyl-4-ethylphenol, 2,6-di-tert-butyl-4-n-butylphenol, 2,6-di-tert-butyl-α-dimethylamino-p-cresol, 6-(4-hydroxy-3, 5-di-tert-butylanilino)-2,4-bisoctyl-thio-1,3,5-triazine, n-octadecyl3-(4'-hydroxy-3', 5'-di-tert-butylphenyl)-propionate, 2,6-di-tert-butyl-4-methylphenol (BHT), tris-(2-methyl-4-hydroxy-5-tert-butylphenyl)butane, tetrakis-[methylene-3-(3',5'-di-tert-butyl-4'-hydroxyphenyl)propionate]methane, 1,3,5-trimethyl-2,4,6-tris(3,5-di-tert-butyl-4-hydroxybenzyl)-benzene, dilauryl thiodipropionate], ultraviolet absorber [e.g. 2-hydroxy-4-n-octoxybenzophenone, 2-hydroxy-4-octadecyloxy-benzophenone, 4-dodecyloxy-2-hydroxybenzophenone, nickel-bis-(o-ethyl-3,5-di-tert-butyl-4-hydroxybenzyl)phosphate, 2-hydroxy-4-n-octoxybenzophenone, 2-(2'-hydroxy-3'-tert-butyl-5'-methyl-phenyl)-5-chlorobenzotriazole, 2-(2'-hydroxy-3', 5'-di-tert-butylphenyl)-5-chlorobenzotriazole, bis-(2,6-dimethyl-4-piperidyl)sebacate, bis-(2,2,6,6-tetramethyl-4-piperidyl)-sebacate), flame retardant (e.g. antimony trioxide, tricresyl phosphate, halogenated alkyltriazine, decabromodiphenyl ether, chlorinated polyethylene), pigment (e.g. titanium oxide), coatability improver (e.g. magnesium benzoate), plasticizer (e.g. process oil), lubricant (e.g. metal salt of fatty acid), antistatic agent (e.g. polyoxyethylene alkyl ether) and the like.

By subjecting the polypropylene composition of the present invention to molding by a per se known method, for example, an injection molding method, there can be obtained a molded article having a good balance of rigidity and impact strength, excellent coatability and excellent appearance. There can be obtained at good moldability even a large-sized molded article having no flow mark and good appearance.

EXAMPLES

The present invention is described in more detail below by way of Examples and Comparative Examples. In the following, parts and % refer to parts by weight and % by weight, respectively, and flexural modulus and Izod impact strength were measured according to ASTM D 790 and ASTM D 256, respectively.

Example 1

There were used, as the component (A), 16 parts of a crystalline ethylene-propylene block copolymer having an ethylene content of 8.0% and a melt flow index of 30 [J 830HV (trade name) manufactured by Ube Industries, Ltd., hereinafter referred to as EP copolymer A] and 42 parts of a crystalline ethylene-propylene block copolymer having an ethylene content of 7.6% and a melt flow index of 15 [J 815HK (trade name) manufactured by Ube Industries, Ltd., hereinafter referred to as EP copolymer B]; as the component (B), 25 parts of an ethylene-propylene rubber having a Mooney viscosity $ML_{1+4}(100°$ C.) of 40 [Tafmer PO480 (trade name) manufactured by Mitsui Petrochemical Industries, Ltd., hereinafter referred to as EPR A]; as the component (D), 10 parts of talc having an average particle diameter of 2.7 μm; as the component (C), 7 parts of an amorphous propylene-ethylene random copolymer having a number-average molecular weight of 7,400 and a propylene content of 90% [Rextac B2A80 (trade name) manufactured by Rexene Co. of U.S.A.]; and as other additives, 0.05 part of BHT, 0.3 part of tetrakis[methylene-3-(3',5'-di-tert-butyl-4-hydroxyphenyl)propionate]methane and 0.6 part of carbon black. These components were kneaded using a high-speed double-screw kneader and then pelletized.

The pellets were molded into test pieces using an injection molding machine, and test pieces were measured for flexural modulus and Izod impact strength.

The test piece was measured for residual paint proportion (%) by the following cross-cut adhesion test, whereby the coatability of the test piece was evaluated. That is, the test piece was coated with an acryl-chlorinated polypropylene undercoat of two-pack type (a product of Cashew K.K.) so as to form a film of 10 μm in thickness; then, thereon was coated an acryl-urethane top coat of twopack type (a product of Cashew K.K.) so as to form a new film of 20 μm in thickness; the coated test piece was dried at 80° C. for 30 minutes and then allowed to stand at room temperature for 40 hours to obtain a coated article. In the film of the coated article were formed 100 squares each of 1 mm × 1 mm using a multi cross cutter. A cellophane self-adhesive tape was attached onto the coated article and was rapidly peeled off at an angle of 45° C. This attaching and peeling procedure was repeated twice. Then, there was examined the proportion (%) of the squares where the film remained.

Whether the molded article has flow marks or not was examined according to the following text method, whereby the appearance of large-sized molded article was evaluated. That is, the pellets of the composition were fed into a 10-oz injection molding machine manufactured by Toshiba Machine Co., Ltd. and molded into a sheet of 367 mm (length) × 143 mm (width) × 2 mm (thickness) at a resin temperature of 250° C., an injection pressure of 1,000 kg/cm², a die temperature of 60° C. and a cycle time of 45 seconds using a flat plate die and a side gate. The sheet was checked for flow marks at the side opposite to the gate.

The melt flow index of the polypropylene composition and the evaluation results of the molded article are shown in Table 1.

Example 2-5

The procedure of Example 1 was repeated except that there were used, as the component (A), EP copolymer A and EP copolymer B; as the component (B), EPR A and SEBS [Kraton G1650(trade name) manufactured by Shell Chemical Co.]; as the component (C), Rextac B2A80 and an amorphous propylene-ethylene random copolymer having a number-average molecular weight of 5,900 and a propylene content of 80% [Rextac B5A35 (trade name) manufactured by Rexene Co. of U.S.A.]; and as the component (D), inorganic fillers as shown in Table 1, all in amounts as shown in Table 1. The results are shown in Table 1.

Examples 6-7

The procedure of Example 1 was repeated except that there were used, as the component (A), EP copolymer A and EP copolymer B; as the component (B), SEBS; as the component (C), Rextac B2A80; and as the component (D), talc, all in amounts as shown in Table 1 The results are shown in Table 1.

Comparative Example 1

The procedure of Example 1 was repeated except that there was used, as the crystalline ethylene-propylene block copolymer, a crystalline ethylene-propylene block copolymer having an ethylene content of 7.6% and a melt flow index of 3.2 [J 703H (trade name) manufactured by Ube Industries, Ltd., hereinafter referred to as EP copolymer a]. The results are shown in Table 1.

Comparative Examples 2–5

The procedure of Example 1 was repeated except that there were used EP copolymer A, EP copolymer B, EPR A, talc and an atactic polypropylene having a propylene content of 100% [Vistac L (trade name) manufactured by Chiba Fine Chemical K.K.]. The results are shown in Table 1.

As is clear from Comparative Example 1, when there is used a crystalline ethylene-propylene block copolymer different from that specified by the present invention, the resulting composition has a low melt flow index and poor appearance. In Comparative Examples 2 and 3 where the thermoplastic elastomer or the inorganic filler is outside the range specified in the present invention, the compositions have poor coatability and reduced low temperature impact strength. In Comparative Example 4 wherein no amorphous propylene-α-olefin random copolymer is used, the composition has a low melt flow index, poor appearance and small low temperature impact strength. In Comparative Example 5 wherein an atactic polypropylene is used in place of the amorphous propylene-α-olefin random copolymer of the present invention, the composition has reduced low temperature impact strength. Thus, all of the compositions of Comparative Examples 1–5 are unable to accomplish the object of the present invention.

Example 8

The procedure of Example 1 was repeated except that there was used, as part of the component (A), a crystalline ethylene-propylene block copolymer having an ethylene content of 5.6% and a melt flow index of 30 (a product of Ube Industries, Ltd., hereinafter referred to as EP copolymer C) and there was used the formulation as shown in Table 1. The results are shown in Table 1.

Example 9

The procedure of Example 1 was repeated except that there was used, as the component (C), an amorphous propylene-butene-1 random copolymer having a number-average molecular weight of 4550 and a propylene content of 60% [Rextac E5 (trade name) manufactured by Rexene Co. of U.S.A.] and there was used the formulation as shown in Table 1. The results are shown in Table 1.

TABLE 1

| | | Example | | | | | | | | | Comparative Example | | | | |
|---|---|---|---|---|---|---|---|---|---|---|---|---|---|---|---|
| | | 1 | 2 | 3 | 4 | 5 | 6 | 7 | 8 | 9 | 1 | 2 | 3 | 4 | 5 |
| Composition | | | | | | | | | | | | | | | | |
| EP copolymer A | (Wt %) | 16 | 12 | 16 | 13 | 14 | 56 | — | — | 16 | — | 21 | 22 | 19 | 16 |
| EP copolymer B | (Wt %) | 42 | 40 | 42 | 38 | 20 | — | 49 | 44 | 42 | — | 47 | 50 | 46 | 42 |
| EP copolymer C | (Wt %) | — | — | — | — | — | — | — | 18 | — | — | — | — | — | — |
| EP copolymer a | (Wt %) | — | — | — | — | — | — | — | — | — | 58 | — | — | — | — |
| EPR-A | (Wt %) | 25 | 25 | 27 | — | 15 | — | — | 25 | 25 | 25 | 15 | 20 | 25 | 25 |
| SEBS | (Wt %) | — | — | — | 27 | 20 | 27 | 30 | — | — | — | — | — | — | — |
| Rextac B2A80 | (Wt %) | 7 | 5 | 5 | 9 | — | 7 | 11 | 5 | — | 7 | 7 | 5 | — | — |
| Rextac B5A35 | (Wt %) | — | — | — | — | 6 | — | — | — | — | — | — | — | — | — |
| Rextac E5 | (Wt %) | — | — | — | — | — | — | — | — | 7 | — | — | — | — | — |
| Vistac L | (Wt %) | — | — | — | — | — | — | — | — | — | — | — | — | — | 7 |
| Talc*1 | (Wt %) | 10 | — | 10 | 10 | 15 | 10 | 10 | 8 | 10 | 10 | 10 | 3 | 10 | 10 |
| Calcium Carbonate*2 | (Wt %) | — | 18 | — | — | — | — | — | — | — | — | — | — | — | — |
| Mica*3 | (Wt %) | — | — | 2 | — | — | — | — | — | — | — | — | — | — | — |
| Magnesium oxysulfate*4 | (Wt %) | — | — | — | 3 | — | — | — | — | — | — | — | — | — | — |
| Properties | | | | | | | | | | | | | | | | |
| Melt flow index | (g/10 min.) | 17 | 16 | 15 | 17 | 15 | 24 | 14 | 16 | 17.5 | 8 | 19 | 16 | 10 | 18 |
| Flexural modulus | (kg/cm²) | 8,300 | 8,000 | 9,500 | 9,000 | 8,100 | 9,100 | 8,800 | 8,900 | 8,000 | 7,800 | 11,500 | 6,200 | 9,300 | 7,200 |
| Izod impact strength | 23° C. | >20 | >20 | >20 | >20 | >20 | >20 | >20 | >20 | >20 | >20 | >20 | >20 | >20 | >20 |
| (notched) (kg.cm/cm) | −30° C. | 10 | 9 | 9 | 8 | 11 | 7.5 | 13 | 8.5 | >11 | 18 | 4 | 7 | 13 | 5 |
| Coatability | (%) | 100 | 100 | 100 | 100 | 100 | 100 | 100 | 100 | 100 | 100 | 70 | 90 | 100 | 100 |
| Appearance of molded article*5 | | ○ | ○ | ○ | ○ | ○ | ○ | ○ | ○ | ○ | X | ○ | ○ | Δ | ○ |
| Overall rating*6 | | ○ | ○ | ○ | ○ | ○ | ○ | ○ | ○ | ○ | X | X | X | X | X |

*1Talc having an average particle diameter of 2.7 μm.
*2Calcium Carbonate having an average diameter of 0.07 μm.
*3Mica having an average particle diameter of 0.6–20 μm.
*4Magnesium oxysulfate is in a granular state formed from fibers having an average fiber diameter of 0.5 μm and an average fiber length of 50 μm.
*5○: Has no flow mark and is good.
Δ: Slightly has flow marks.
X: Has flow marks and is poor.
*6○: Good.
X: Poor.

What is claimed is:

1. A polypropylene composition comprising:
(A) 35–74% by weight of a crystalline ethylene-propylene block copolymer having an ethylene content of 5–20% by weight and a melt flow index of 11–90,
(B) 20–40% by weight of a thermoplastic elastomer,
(C) 1–15% by weight of an amorphous propylene-α-olefin random copolymer having a number-average molecular weight of 1,000–20,000 and a propylene content of 40–95% by weight, and
(D) 5–25% by weight of an inorganic filler.

2. A polypropylene composition according to claim 1, wherein the amount of the component (A) is 44–70% by weight.

3. A polypropylene composition according to claim 1, wherein the component (A) consists of two or more ethylene-propylene block copolymers each having an ethylene content of said range and a melt flow index of said range with the proviso that the melt flow indexes of the copolymers differ from each other.

4. A polypropylene composition according to claim 3, wherein one of said ethylene-propylene block copolymers has a melt flow index of 11–50 and a second of said ethylene-propylene block copolymers has a melt flow index of 20–90.

5. A polypropylene composition according to claim 1 or wherein the amorphous propylene-α-olefin random copolymer as the component (C) is a propylene-ethylene random copolymer.

6. A polypropylene composition according to claim 1, wherein the amount of the component (D) is 7–20% by weight.

7. A polypropylene composition according to claim 1, wherein the component (D) is in a state of powder, flake or short fiber.

8. A polypropylene composition according to claim 2, wherein the amorphous propylene-α-olefin random copolymer as the component (C) is a propylene-ethylene random copolymer.

9. A polypropylene composition according to claim 1 wherein said thermoplastic elastomer is an ethylene-propylene elastomer, a hydrogenated styrene-butadiene-styrene elastomer or a mixture thereof.

* * * * *